C. A. KINNEY.
ENGINE AND MEANS FOR CONTROLLING THE OPERATION OF THE SAME.
APPLICATION FILED APR. 23, 1912.
1,150,683.
Patented Aug. 17, 1915.
3 SHEETS—SHEET 3.
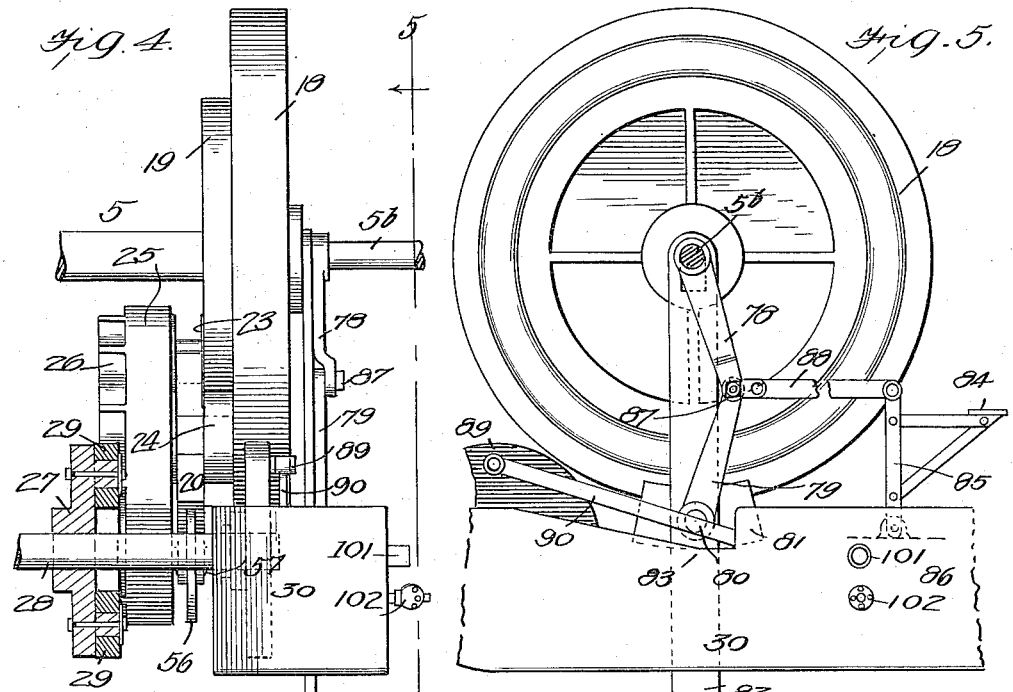
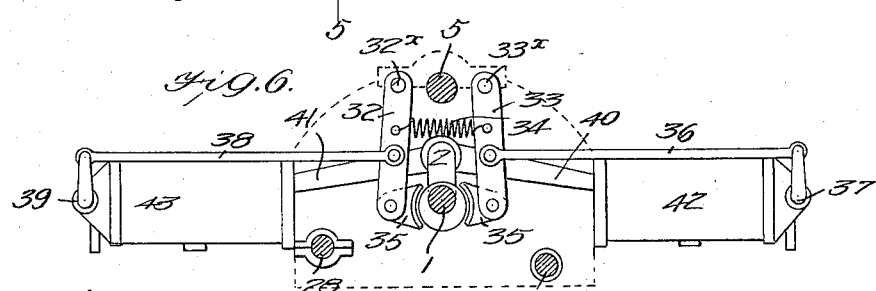
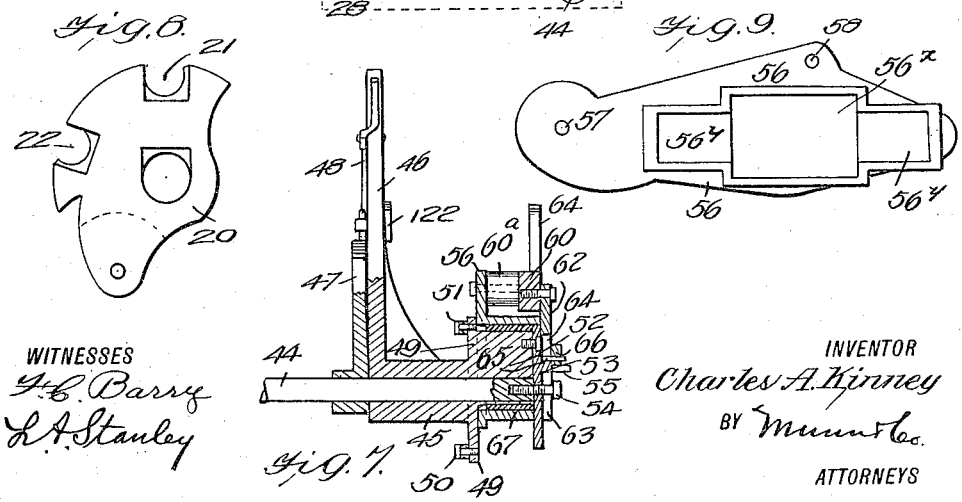
WITNESSES
Y. C. Barry
L. A. Stanley
INVENTOR
Charles A. Kinney
BY Munn & Co.
ATTORNEYS

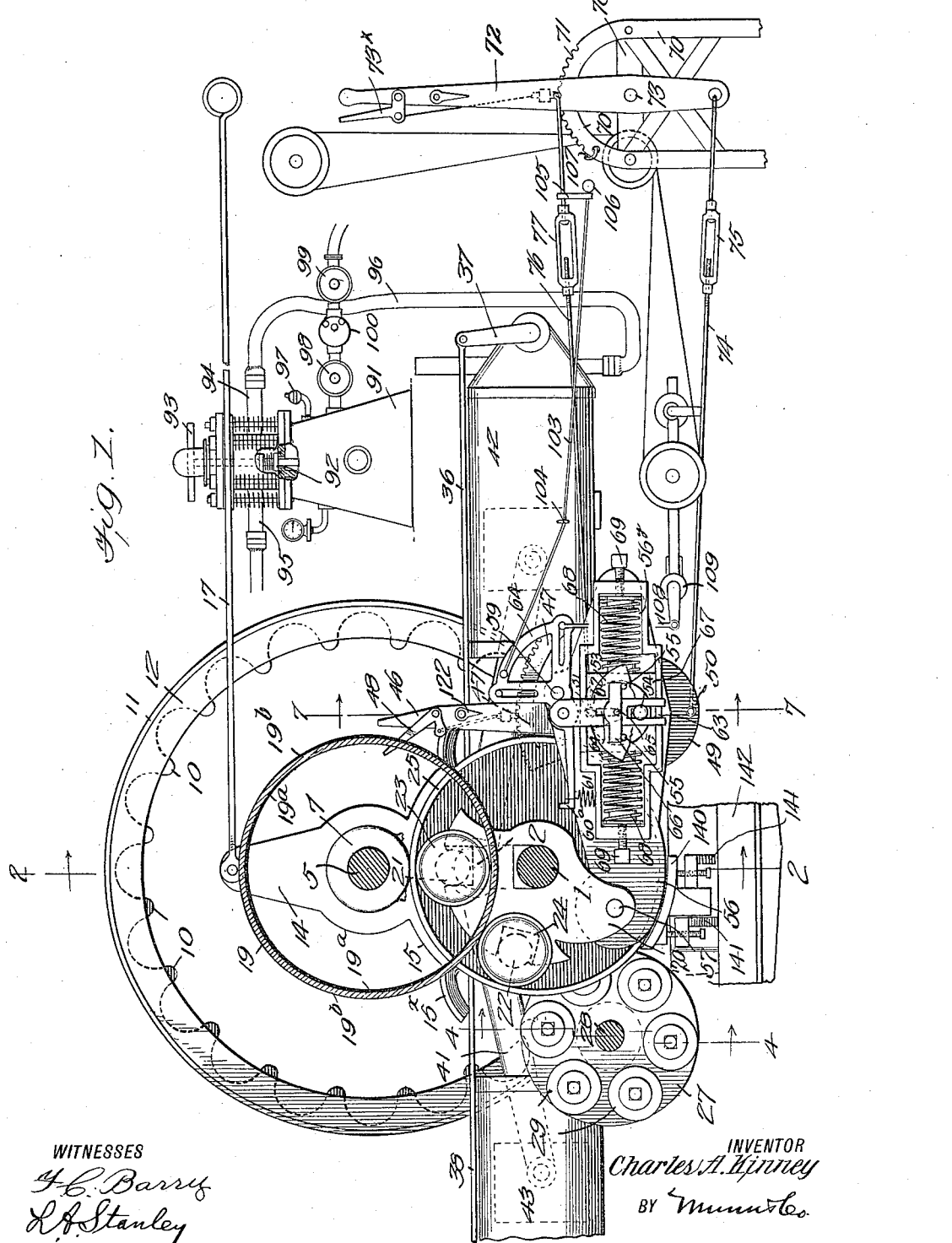

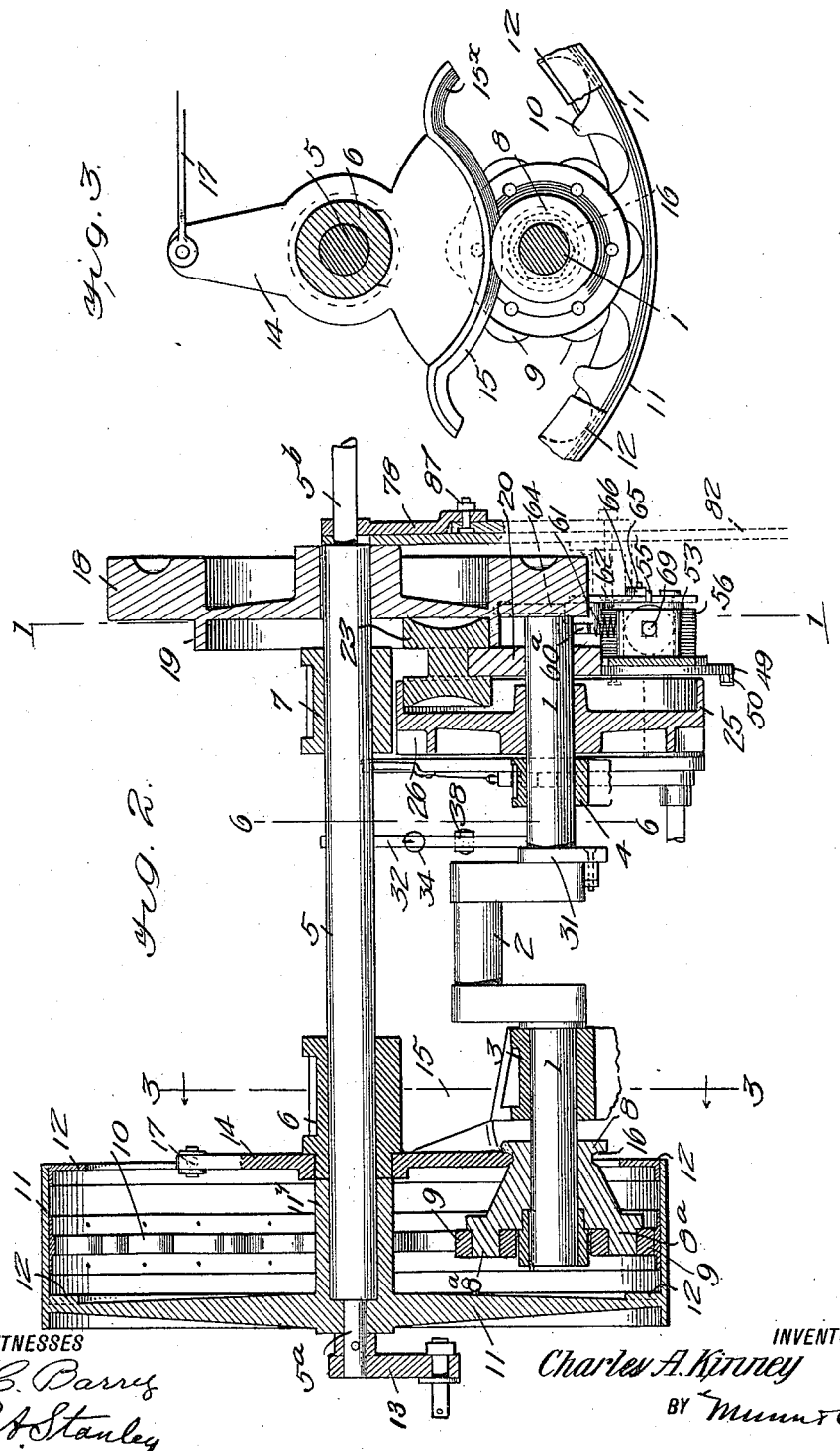

UNITED STATES PATENT OFFICE.

CHARLES A. KINNEY, OF SENECA, PENNSYLVANIA.

ENGINE AND MEANS FOR CONTROLLING THE OPERATION OF THE SAME.

1,150,683.  Specification of Letters Patent.  Patented Aug. 17, 1915.

Application filed April 23, 1912. Serial No. 692,688.

*To all whom it may concern:*

Be it known that I, CHARLES A. KINNEY, a citizen of the United States, and a resident of Seneca, in the county of Venango and State of Pennsylvania, have made certain new and useful Improvements in Engines and Means for Controlling the Operation of the Same, of which the following is a specification.

My invention relates to improvements in engines, more particularly internal combustion, and it consists in the arrangements, constructions, and combinations herein described and claimed.

An object of my invention is to provide an improved means of starting a gas engine.

A further object of my invention is to provide means for reversing the engine.

A further object of my invention is to provide a device which is designed to be used for running a well drilling apparatus having means by which the engine may be permitted to race during the time the drill is dropping.

Other objects and advantages will appear in the following specification and the novel features of the device will be particularly pointed out in the appended claims.

My invention is illustrated in the accompanying drawings forming part of this application in which—

Figure 1 is a side view of a portion of the engine, certain parts being shown in section for the sake of clearness, Fig. 2 is a section along the line 2—2 of Fig. 1 looking in the direction of the arrows, certain parts being omitted for the sake of clearness, Fig. 3 is a section along the line 3—3 of Fig. 2, looking in the direction of the arrows, Fig. 4 is a section through one of the roller gears on the line 4—4 of Fig. 1, the adjacent parts being shown in side elevation, Fig. 5 is a section along the line 5—5 of Fig. 4, looking in the direction of the arrows, Fig. 6 is a section along the line 6—6 of Fig. 2 looking in the direction of the arrows, Fig. 7 is a section along the line 7—7 of Fig. 1, Fig. 8 is a detail view of oscillating yoke, and Fig. 9 is a detail view of the frame which carries the mechanism operated by the eccentric.

In carrying out my invention I provide a main crank shaft 1 having a U-shaped portion 2 at or near its center. The shaft is mounted in appropriate bearings such as those shown at 3 and 4, these bearings being supported on any suitable base (not shown). Parallel to the crank shaft 1 is an auxiliary shaft 5, which may be supported in bearings such as those shown at 6 and 7. On one end of the crank shaft 1 is mounted a slidable gear 8 of the shape shown in Fig. 2. This gear is provided with a series of outwardly extending journals or stub shafts $8^a$ upon which are mounted wear resisting rollers 9, which are arranged to engage the internal gear 10, which is secured to and which forms a part of the drive wheel 11. The latter is mounted upon the end of the shaft 5, the spokes $11^x$ being fastened to a hub $11^y$ in the manner shown in Fig. 2. Projecting inwardly from the outer portion of the drive wheel 11 are flanges or oil walls 12 whose purpose is to prevent the oil from reaching the belt. On the reduced portion $5^a$ of the shaft I place a crank 13 by means of which water may be pumped from a distant supply by means of pull rods (not shown).

Loosely disposed on an extension of the bearing 6 is a lever 14. The bottom of this lever has a curved flange 15 of the shape shown in Figs. 2 and 3. This flange 15 fits in a groove 8 in the slidable gear 8. The curvature of the flange is such that when in the position shown in Fig. 3 the gear 16 will be in mesh with the internal gear 10, but when switched to either side by means of the pull rod 17, the curved flange will force the gear toward the bearing 3 (see Fig. 2), thus disconnecting the crank shaft from the drive wheel.

On the opposite end of the auxiliary shaft 5 is a fly wheel 18 which has an annular flange on one side thereof. This flange has an inner frictional surface $19^a$ and an outer frictional surface $19^b$. Rotatably disposed on the shaft 1 is a yoke 20, like that shown in Fig. 8. This yoke is provided with sockets 21 and 22, the former being arranged to receive a roller 23 like that shown in Figs. 1 and 2 and the latter a similar roller 24. The roller 23, as will be seen from Fig. 2 is arranged to engage the interior portion $19^a$ of the annular flange. The opposite side of the roller also engages the interior of a friction wheel 25 carried by the shaft 1. The roller 24 is adapted to engage the inner side of the friction wheel 25 and the outer frictional surface $19^b$ of the annular flange. On the opposite side of the friction wheel 25 is an integral gear 26, which is arranged to engage a roller gear 27 on a shaft 28. The gear 27 is provided with wear resisting rollers 29 arranged to engage in the sockets in the gear 26. The shaft 28 drives the air pump or compressor 30. This pump may be of any suitable type. I have indicated it diagrammatically in Fig. 4.

Referring now to Fig. 2, I have shown therein an eccentric 31 which is mounted on the crank shaft 1. The mechanism operated by this eccentric is best shown in Fig. 6. In this figure it will be seen that there are two rock arms 32 and 33 which are pivotally supported at $32^x$ and $33^x$ respectively. These arms are connected together by means of a spring 34, and each arm bears a shoe 35. The arm 33 is connected by means of a rod 36 with the valve 37, while a rod 38 connects the arm 32 with the valve 39. The U-shaped portion 2 of the crank shaft is connected by means of the connecting rods 40 and 41 to the pistons in the cylinders 42 and 43 respectively.

Disposed on a shaft 44 is the hub 45 of a lever 46 (see Fig. 7) which is provided with a locking segment 47 arranged to be engaged by a locking member 48. Secured to the hub 45 is a disk 49 which is provided with pins 50 and 51 respectively. Integral with the disk on the opposite side from the pins is an eccentric 52 to which is secured a retaining plate 53 by means of a center bolt 54. The plate 53 is provided with a pair of pins 55 (see Fig. 1). Referring now to Fig. 9 I have shown therein a connecting yoke 56. This yoke is pivotally connected at 57 with the oscillating yoke 20 (see Fig. 1). The yoke 56 is provided with an opening 58 for the pivot pin 59 of a bell crank lever 60. One arm of this bell crank lever is formed in the shape of a hook $60^a$ to which is attached the spring 61, the latter being secured to the body portion of the connecting yoke 56.

Pivotally connected to the bell crank lever 60 is a link 62 having a slot 63 in its bottom portion arranged to receive the center bolt 54. The link 62 is also provided with a slot 64 arranged to receive the bolt 65 of an adjustable cross member 66. As will be seen from Fig. 7 the lever 60 has an integral portion $60^a$ which extends toward the body portion of the connecting yoke 56 upon which the bell crank lever 60 is mounted, as previously stated. The eccentric 52 is mounted in a slidable plate 67 which is disposed in the central opening $56^x$ of the connecting yoke 56. In Fig. 9, it will be seen that there are laterally extending recesses $56^y$ at each end of the opening $56^x$. Within these recesses are disposed springs 68 which bear at one end on the slidable block or plate 67 and the tension of which may be regulated by means of adjusting screws 69 which pass through portions of the connecting yoke.

At the right of Fig. 1, I have shown a long distance means of control. This comprises a support 70, the upper end of which is provided with a locking segment 71. A lever 72 is pivotally mounted at 73 upon the support 70 and is provided with a locking member $73^x$ arranged to engage the locking segment. The lower end of the lever is connected by means of a rod 74 with the pin 50 on the disk 49. A turn buckle 75 is provided for permitting the adjustment of the position of the lever. A similar rod 76 is secured to the upper pin 51 and is also provided with a turn buckle 77.

Referring now to Fig. 5, I have shown therein the fly wheel 18. The shaft 5 upon which this wheel is mounted has a reduced portion $5^b$ upon which is pivotally mounted a link 78, which forms one element of a toggle joint. The other element is the link 79, which is pivotally connected by means of a bolt or pin 80 with a brake shoe 81. The bolt 80 passes through an upright 82 which is provided with a slot 83 to guide the bolt. The means for manipulating this brake consists of a foot pedal 84 carried by a frame 85 which is pivoted at 86 upon a suitable foundation such as the floor or base of the engine, and whose upper part is pivotally attached to the common joining pin 87 by means of a link 88. In Figs. 4 and 5 may also be seen the crank disk 89. This disk is located on the shaft 28 and drives the pump piston by means of a connecting rod 90.

In Fig. 1 I have shown a receiver which comprises a casing 91 having therein a valve 92 which may be operated by a handle 93. The upper part of the receiver is provided with outlet pipes 94 and 95, the former communicating by means of a flexible pipe 96 with the cylinder 42, and the latter communicating with the opposite cylinder 43 by a tube (not shown) similar to the tube 96. The receiver is provided with a try cock 97. At 98 and 99 I have shown a pair of priming valves, the valve 98 being a gate valve and the valve 99 being a globe valve. At 100 is shown an air intake. The valves 98 and 99 and the air inlet 100 are on a branch pipe which leads to the fuel feed line. The receiver itself is connected with the pump at 101. The pump is also provided with an air inlet 102.

From the foregoing description of the various parts of the device the operation thereof may be readily understood. The lever 14 is standing at neutral as shown in Fig. 3. The engine is put on horizontal centers. The valve 92 of the receiver is now opened by means of the handle 93 and the two valves 98 and 99 are opened in the order named. The receiver is in fact in the nature of an auxiliary mixing chamber. When the valves 98 and 99 are open as described, the receiver fills with mixed fuel and air, and it is by means of this mixture that the engine is started. The valve 92 prevents back firing for it will be seen that the receiver also acts in the nature of a safety valve. The mixture passes to one of the cylinders. The engine is now primed. Shut in succession as they were opened, the priming valves 98 and 99. Now shut the valve 92. The fly wheel 18 is now revolved by hand and the lever 46 is moved to the right, i. e., in the direction indicated by the arrow in Fig. 1. This movement tends to move the roller 23 into position so as to drive the engine in direct motion. If moved to the left the engine starts in reverse motion in consequence of the roller 24 contacting with the frictional surface of the friction wheel 25 and the external frictional surface 19b of the annular flange on the fly wheel. The engine reverses as often as the lever passes the neutral position sufficiently to make contact with the friction surfaces of the fly wheel by one or another of the friction grips alternating. When the lever L is placed in a neutral position, i. e., in that shown in Fig. 1, neither of the rollers 23 or 24 are in a position to exert a grip on the fly wheel. They therefore are idle. This will permit the engine to race and when the engine is used with a drill will permit the drill to drop suddenly.

The shifting of the rollers 23 and 24 may be accomplished by means of the lever 72 which may be situated at some distance from the engine. It will be noted that on the lever 46 is a dog 122, which may be turned up so as to hold the locking member 48 to keep the locking tooth out of engagement with the locking segment 47. Now when the lever 72 is operated the disk 49 will be turned by means of the connecting rods 76 and 74.

Referring now to Fig. 7, it will be seen that when the disk 49 is turned the eccentric 52 will also be turned, and it will cause the yoke 56 to move toward or away from the lower end of the oscillating yoke 20. The yoke 56 however is pivotally connected at 57, and this will cause the oscillating yoke to be shifted so as to bring the friction rollers 23 or 24 into or out of frictional engagement with the rim 19 of the fly wheel and the rim of the friction wheel 25.

Connected to the upper part of the bell crank lever 60 is a pull cord or cable 103 which passes through a ring 104, thence rearwardly through a guide member 105 and terminates in a ring 106. When the latter is pulled and placed on the hook 107 on the frame 70 the bell crank lever is shifted about its pivot 59. This bell crank lever is also shifted whenever the levers 46 or 72 are shifted. It will be remembered that when either of these levers are shifted the plate 49 is turned as before described. This turns the eccentric 52, and one of the pins 55 (see Fig. 1) will engage the cross member 66, thereby raising the bar 62 and shifting the spring-controlled arm of the bell crank lever upwardly. The opposite end of the bell crank lever is connected by means of a link 108 to a valve 109 in the feed line. By this construction it will be seen that the valve may not be opened by the levers 46 or 72 until these levers have passed the neutral point. The precise moment at which the valve is opened may be adjusted by moving the cross piece 66 with respect to the bar 62, this adjustment being effected by the bolt 65, which passes through the slot 64 in the bar 62 as before described.

In order to relieve the shaft 5 from the weight of the yokes 20 and 56 I provide an adjustable chair 140. This chair is supported on chair bracket extensions 141 of the sub-base 142. The chair also provides means whereby the neutral position of the friction grips may be preserved notwithstanding a possible wear of the pivotal bearings of the yoke 20.

I claim;

1. In an engine, a main crank shaft, a friction wheel on said main crank shaft, an auxiliary shaft, a fly wheel carried by said auxiliary shaft, and friction means arranged to be brought simultaneously into engagement with said friction wheel and said fly wheel for imparting the motion of the crank shaft to the auxiliary shaft.

2. In an engine, a main crank shaft, a friction wheel on said main crank shaft, an auxiliary shaft, a fly wheel carried by said auxiliary shaft, friction means arranged to be brought simultaneously into engagement with said friction wheel and said fly wheel for imparting the motion of the crank shaft to the auxiliary shaft, said friction means comprising an oscillating yoke, and rollers carried by said oscillating yoke and arranged to engage both the fly wheel and the friction wheel.

3. In an engine, a crank shaft, a friction wheel on said crank shaft provided with an annular laterally extending flange, an auxiliary shaft, a fly wheel carried by said auxiliary shaft and provided with an auxiliary annular flange extending toward said friction wheel, a yoke loosely mounted on said crank shaft between said friction wheel and said fly wheel, and rollers carried by said yoke and arranged to simultaneously engage the inner surface of the flanges of said fly wheel and said friction wheel.

4. In an engine, a crank shaft, a friction wheel on said crank shaft provided with an annular laterally extending flange, an auxiliary shaft, a fly wheel carried by said auxiliary shaft and provided with an auxiliary annular flange extending toward said friction wheel, a yoke loosely mounted on said crank shaft between said friction wheel and said fly wheel, rollers carried by said yoke and arranged to simultaneously engage the inner surface of the flanges of said fly wheel and said friction wheel, means for shifting said rollers into and out of engagement with said friction surfaces, said means comprising a connecting yoke pivotally secured to said oscillating yoke at one end thereof, an eccentric for shifting the position of the connecting yoke, and a lever for operating the eccentric.

5. In an engine, a crank shaft, a friction wheel on said crank shaft provided with an annular laterally extending flange, an auxiliary shaft, a fly wheel carried by said auxiliary shaft and provided with an auxiliary annular flange extending toward said friction wheel, a yoke loosely mounted on said crank shaft between said friction wheel and said fly wheel, rollers carried by said yoke and arranged to simultaneously engage the inner surface of the flanges of said fly wheel and said friction wheel, means for shifting said rollers into and out of engagement with said friction surfaces, said means comprising a connecting yoke pivotally secured to said oscillating yoke at one end thereof, an eccentric for shifting the position of the connecting yoke, a lever for operating the eccentric, a main feed valve, and means operated by the shifting of the eccentric for controlling said main feed valve.

6. In an engine, a crank shaft, a friction wheel on said crank shaft provided with an annular laterally extending flange, an auxiliary shaft, a fly wheel carried by said auxiliary shaft and provided with an auxiliary annular flange extending toward said friction wheel, a yoke loosely mounted on said crank shaft between said friction wheel and said fly wheel, rollers carried by said yoke and arranged to simultaneously engage the inner surface of the flanges of said fly wheel and said friction wheel, means for shifting said rollers into and out of engagement with said friction surfaces, said means comprising a connecting yoke pivotally secured to said oscillating yoke at one end thereof, an eccentric for shifting the position of the connecting yoke, a lever for operating the eccentric, a main feed valve, means operated by the shifting of the eccentric for controlling said main feed valve, said valve controlling means comprising a bell crank lever carried by said connecting yoke, a bar connected with said bell crank lever, a cross member secured to said bar, pins carried by said eccentric and arranged to engage said cross lever for moving the bar, and connections between said bell crank lever and said valve.

7. In an engine, a main crank shaft, a slidable gear on said crank shaft, said gear being provided with a series of wear resisting rollers, an auxiliary shaft, a drive wheel loosely carried by said auxiliary shaft, an internal gear secured to said drive wheel and arranged to be engaged by the rollers on said slidable gear, and means for shifting said slidable gear into and out of mesh with said internal gear.

8. In an engine, a main crank shaft, a slidable gear on said crank shaft, said gear being provided with a series of wear resisting rollers, an auxiliary shaft, a drive wheel loosely carried by said auxiliary shaft, an internal gear secured to said drive wheel and arranged to be engaged by the rollers on said slidable gear, and means for shifting said slidable gear into and out of mesh with said internal gear, said means comprising a lever having a curved cam member at its bottom, said cam member being arranged to engage a groove in the sliding gear.

9. In an engine, a main crank shaft, a slidable gear on said crank shaft, said gear being provided with a series of wear resisting rollers, an auxiliary shaft, a drive wheel loosely carried by said auxiliary shaft, an internal gear secured to said drive wheel and arranged to be engaged by the rollers on said slidable gear, means for shifting said slidable gear into and out of mesh with said internal gear, a toggle joint secured at one end to said auxiliary shaft, a shoe carried by the other end of said toggle joint, a link connected at the central portion of said toggle joint, an oscillating frame pivotally connected to said link, and a foot pedal carried by said frame.

CHARLES A. KINNEY.

Signed in the presence of—
ESTELLA R. STEWART,
J. W. BARR.

Copies of this patent may be obtained for five cents each, by addressing the "Commissioner of Patents, Washington, D. C."

It is hereby certified that in Letters Patent No. 1,150,683, granted August 17, 1915, upon the application of Charles A. Kinney, of Seneca, Pennsylvania, for an improvement in "Engines and Means for Controlling the Operation of the Same," errors appear in the printed specification requiring correction as follows: Page 1, line 84, for the reference-numeral "8," first occurrence, read *16;* same page, line 86, for the reference-numeral "16" read *8;* and that the said Letters Patent should be read with these corrections therein that the same may conform to the record of the case in the Patent Office.

Signed and sealed this 16th day of November, A. D., 1915.

[SEAL.]

J. T. NEWTON,
*Acting Commissioner of Patents.*